June 6, 1933.   D. S. KENNEDY   1,913,280
TRACTION BELT
Filed Dec. 4, 1931   2 Sheets-Sheet 2
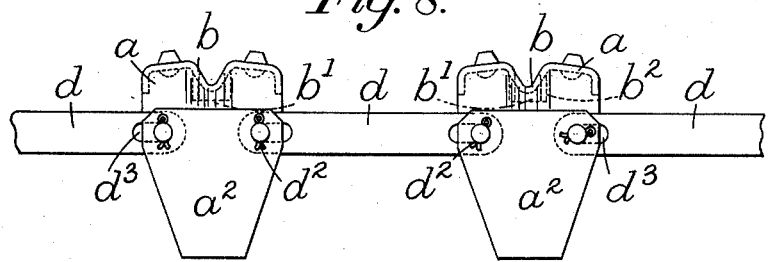
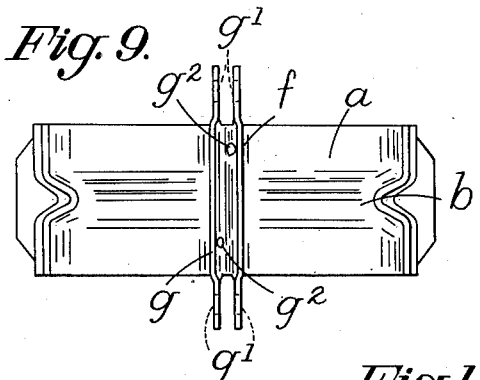
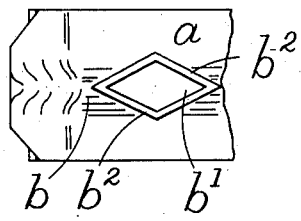   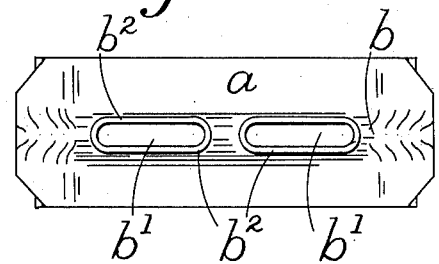
Inventor:—
Donald S. Kennedy,
By:— Smith, Michael & Gardiner,
Attorneys.

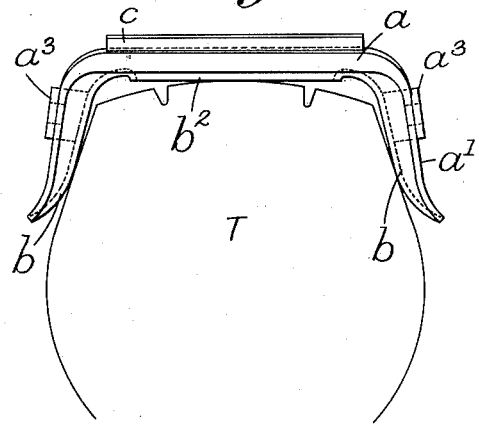
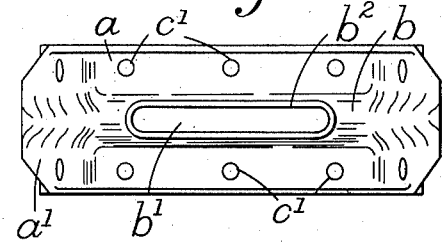
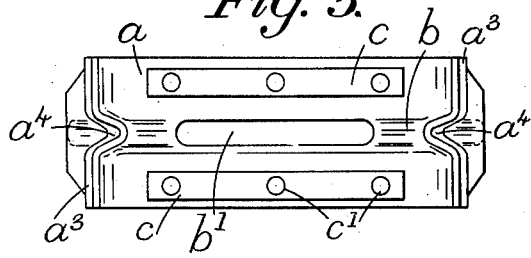
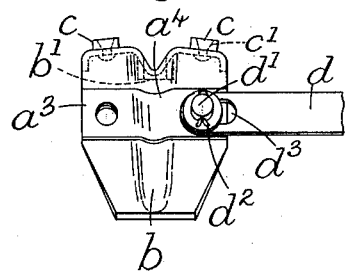
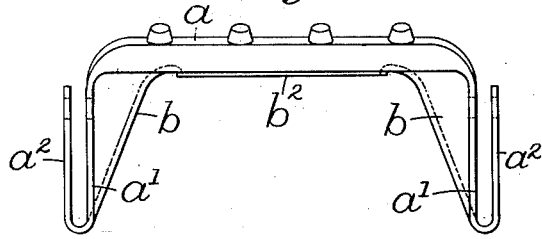
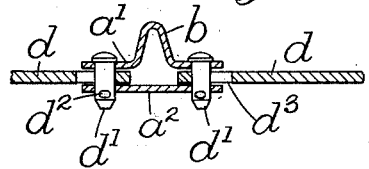
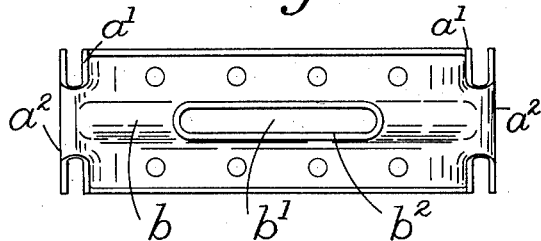

Patented June 6, 1933

1,913,280

UNITED STATES PATENT OFFICE

DONALD STUART KENNEDY, OF LONGPARISH, ENGLAND

TRACTION BELT

Application filed December 4, 1931, Serial No. 579,084, and in Great Britain December 24, 1930.

This invention relates to traction belts for the pneumatic tires of road vehicles and of the overall type consisting of shoes coupled up in series by pivoted or flexible connecting links, and adapted to extend around two road wheels on the same side of a road vehicle. One object is to provide an overall belt shoe of simple and inexpensive construction, which is easily cast or pressed to shape in one piece and is also corrugated to give strength and rigidity and to give proper engagement with the walls and tread of the pneumatic tires.

A further object is to improve adhesion with the track surface and to prevent slip inside the traction belt.

Another object is to construct the shoe in such a way as to produce a gripping action between the tread of the tire and the base or tread plate of the shoe, while facilitating the rolling of the wheel as it beds down into the trough-shaped traction belt and subsequently disengages therefrom, especially when the vehicle is travelling in a curved path. Such arrangement provides the maximum resistance to ground shear, and the maximum resistance to wheel spin inside the overall belt without damaging or causing excessive wear of the tire.

The invention is hereafter described with reference to the accompanying drawings, in which:—

Fig. 1 is a front elevation of one form of the corrugated shoe.

Figs. 2, 3 and 4 are respectively an inverted plan showing the inner face, a plan view showing the outer face, and an end elevation of the shoe shown in Fig. 1.

Figs. 5, 6, 7 and 8 relate to another form of construction, Fig. 5 being a sectional plan of the link connection, Fig. 6 a front elevation of the belt shoe, Fig. 7 an inverted plan view showing the inner face of the shoe and Fig. 8 an end view showing two shoes and connecting links as part of the upper run of this traction belt.

Fig. 9 is a plan view showing a centrally arranged link connection upon the one-piece corrugated shoe.

Figs. 10 and 11 are diagrams representing other modifications in the corrugations of the shoes.

Referring first to Figs. 1 to 4, the shoe comprises a substantially flat base or tread plate $a$ and is made in one piece with inwardly turned end walls $a^1 a^1$. The tread plate $a$ is substantially rectilinear and is joined at its ends by easy bends with the ends $a^1 a^1$. The shoe is corrugated or fluted longitudinally as at $b$ from one end to the other, that is to say across the tread of the tire or the line of travel of the traction belt, each corrugation being approximately central of the flat base and including the usual ridge or crest on one side and groove or mouth on the other. The corrugation or fluting $b$ also extends along the inwardly turned ends $a^1 a^1$ of the one-piece shoe $a$. The ridge portion of the corrugation $b$ is rounded or arched so that there is no gripping or wearing between the tire-walls and the end walls $a^1 a^1$ during the rolling of the tire into and out of the traction belt, but there is a gripping action between the tire-tread and the inner face of the base or tread plate $a$ of the shoe, due to the relatively sharp edges of slots or apertures $b^1$ in the corrugation $b$. I have indicated the pneumatic tire in its deflected condition under load, with the side walls bulging outwards, at T in Fig. 1, but the working of these traction belts is well known; see for example, my prior patent specification No. 1,808,416 dated June 2nd 1931.

The corrugation $b$ across the tread plate $a$ of the shoe is preferably a V-shaped fluting, the open mouth of the V or groove of the corrugation being directed outwards from the wheels, that is towards the ground or track beneath the lower run of the traction belt. This also gives a wedging action to the tire tread between adjacent shoes or between two crests or ridges of the corrugations so as to lessen or avoid wheel spin.

In order to avoid undue wear of the tire walls, the convex inner faces or ridges of the corrugations in the end walls $a^1$ are flatter (or less steep) than the ridge of the corrugation in the tread plate of the shoe. This is best seen in Fig. 2, from which it will be understood that as the wheel rolls over a stationary shoe of the traction belt, the side walls of the tire do not rub or chafe against sharp ridges on the inturned ends $a^1$ $a^1$ but have a smooth sliding engagement with the convex face of the corrugation in one or both of the end walls $a^1$ $a^1$.

The corrugations $b$ in the end walls $a^1$ are aligned with and continuous with the corrugation $b$ in the tread portion of the shoe $a$, as clearly shown in Fig. 4.

Renewable strakes $c$ may be rivetted as at $c^1$ or otherwise secured across the tread plate $a$ of the shoe, respectively fore and aft of the transverse corrugation $b$ as shown in Figures 3 and 4.

Upon the outer faces of the walls $a^1$ $a^1$ there are fitted strengthening strips $a^3$. These strips have sunk middle portions or humps $a^4$ which will bed snugly into the corrugations of flutings $b$ in the said side walls. Each said strip $a^3$ is secured to the side wall by, for example, spot-welding, and these strips $a^3$ provide anchorages for the coupling of adjacent shoes together. The shoes may be coupled up in series by connecting links $d$ which are pivotally secured to the shoes laterally and at each side thereof by means of pivots $d^1$ having cross pins $d^2$, these pivots passing through the strips $a^3$ and side walls $a^1$. Such an arrangement will be better understood from Figs. 5 and 8, hereafter described. Each link $d$ may conveniently be slotted at its ends as shown at $d^3$, to allow slight lateral movement of the shoes and to facilitate the compact storing or handling of the traction belt.

In the arrangement of Figs. 5, 6, 7 and 8, I have shown the inwardly directed side walls $a^1$ $a^1$ of the shoe turned out again to form parallel walls at $a^2$ $a^2$, the connecting links $d$ being arranged between said parts $a^1$ and $a^2$ on each side of the shoe and pivotally secured in place by means of pins $d^1$ as in the previous example.

If preferred, the shoes may be coupled up by connecting links arranged on the centre line of the traction belt and having their ends flexibly secured to the shoes. In such case, see Fig. 9, I form a fore-and-aft trough or depression $f$ in the shoe $a$ (such trough running at right angles to the transverse corrugation $b$) and in this trough $f$, I anchor a rod or bar $g$ as by rivets $g^2$, such as a U-shaped stamping having two eyes $g^1$ $g^1$ at each end, one pair of eyes being situated beyond the leading edge and the other behind the trailing edge of the shoe $a$. These eyes $g^1$ $g^1$ are engaged by links which may be similar to the bars $d$ pivotally secured at their respective ends to the trailing and the leading eyes of adjacent shoes.

The transverse corrugation or fluting $b$ which extends across the shoe is preferably provided with one or more slots or apertures $b^1$ in the middle of the base or tread plate $a$. As will be seen from Figs. 1, 2, 3 and 4, the aperture $b^1$ may be in the form of an elongate slot with rounded ends and arranged in the length of the corrugation $b$ and therefore longitudinally of the shoe $a$ and transversely of the traction belt. This slot is shown with an upstanding rim or flange $b^2$ extending along the fore and aft edges of the slot and around its ends, this flange $b^2$ being directed inwardly towards the tread of the tire T.

Where a single slot $b^1$ is provided in the length of each corrugation $b$, it is preferably arranged midway across that portion of the shoe which contacts with the tread of the tire inside the belt-shoe, its length being about the same as, or slightly greater than, the width of the tire tread under load.

I may employ a plurality of these slots or apertures $b^1$ for example in the form of loops, or diamond shaped figures, as illustrated diagrammatically in Figs. 10 and 11, with marginal flanges $b^2$ $b^2$ of corresponding shape.

In all cases, these slots or apertures $b^1$ allow air or water to escape easily from under the corrugation or fluting $b$ when the shoe $a$ is making contact with the ground, and thereby prevent slip in a rapidly moving belt; moreover, these slots or apertures $b^1$ in the corrugation, especially when fitted with the marginal upturned flanges $b^2$, give a better surface for grip between the shoe and the pneumatic tire, so as to reduce or abolish wheel-spin inside the chain.

The corrugated shoe $a$ may be made of any suitable material such as manganese steel and any suitable form of connecting links between adjacent shoes may be employed. The corrugation or fluting in each side wall $a^1$ $a^1$ is continuous with the corrugation or fluting in the tread plate $a$, but the ridge or crest of such continuous corrugation decreases in angular steepness from the tread $a$ to the side walls $a^1$.

What I claim is:—

1. A shoe for a traction belt of the overall type, comprising a rectilinear tread plate arranged transversely of the belt, end walls set angularly to said tread plate and from the ends of said tread plate, said tread plate and end walls being formed in one piece, and a central corrugation formed longitudinally in said tread plate and continued along said end walls, said corrugation including a ridge directed inwardly of the shoe, the ridge of said corrugation decreasing in steepness from that portion which is in the tread plate to those portions of the ridge which are in the end walls.

2. In a shoe for a traction belt of the overall type and adapted to be engaged by a wheel tire, the combination of a rectilinear tread plate arranged transversely of the belt, of end walls set angularly to said tread plate and extending from the opposite ends thereof, said tread plate and end walls being formed integral, and of a corrugation formed in said tread plate and angularly-set end walls, said corrugation forming a continuous fluting which extends from end to end of the shoe and across the tread plate, with the crest of said corrugation directly inwardly of the shoe, the crest in the tread plate being arranged to provide a gripping action between the tire tread and the tread plate, and the crest in the end walls being convex towards the interior whereby to reduce wear during rolling action between the walls of the tire and the end walls of the shoe.

3. A shoe for a traction belt of the overall type, comprising a rectilinear tread plate arranged transversely of the belt, end walls set angularly to said tread plate and extending from the ends of said tread plate, said tread plate and end walls being formed in one piece, and a longitudinal corrugation formed centrally in said rectilinear tread plate, said corrugation including an angular ridge directed inwardly of the shoe and being continued along the said end walls, an aperture in the ridge in the tread plate for a portion of the length of said tread plate, and a flange around said aperture, the ridge of said corrugation decreasing in angular steepness from that portion which is in the tread plate to those portions of the ridge which are in the end walls.

4. A shoe for a traction belt of the overall type, having a tread plate arranged transversely of the belt, end walls set angularly to said tread plate and from the ends of said tread plate, a corrugation in said tread plate arranged transversely of the belt and extending along the end walls, said corrugation having its ridge upon the inner face of the shoe, a strengthening strip secured upon the outer face of each end wall, said strengthening strip including a hump adapted to nest in the groove of the fluted corrugation in said end wall, and links to connect adjacent shoes, said connecting links being pivoted to the said strengthening strips.

5. A shoe for a traction belt of the overall type, comprising a tread plate having a substantially rectilinear face to make contact with the ground, internally directed end walls at the ends of said tread plate, said tread plate and end walls being formed integral, outwardly directed extensions from the inner ends of said end walls, cross pins between said end walls and said extensions, rigid link members each mounted at one end between said end walls and said extensions from the side walls, said link members being pivoted upon said cross pins, and a fluting extending along the external face of said tread plate from end to end thereof, said fluting having on the internal face of the shoe a ridge adapted to be engaged by a wheel.

In testimony whereof I have affixed my signature.

DONALD STUART KENNEDY.